(12) United States Patent
Davis

(10) Patent No.: US 11,708,803 B2
(45) Date of Patent: Jul. 25, 2023

(54) THRUST REVERSER CASCADE ARRAY AND METHOD FOR PRODUCING THE SAME

(71) Applicant: Rohr, Inc., Chula Vista, CA (US)

(72) Inventor: Jennifer Davis, La Jolla, CA (US)

(73) Assignee: Rohr, Inc., Chula Vista, CA (US)

(*) Notice: Subject to any disclaimer, the term of this patent is extended or adjusted under 35 U.S.C. 154(b) by 0 days.

(21) Appl. No.: 17/323,212

(22) Filed: May 18, 2021

(65) Prior Publication Data
US 2022/0056869 A1 Feb. 24, 2022

Related U.S. Application Data

(62) Division of application No. 16/131,902, filed on Sep. 14, 2018, now Pat. No. 11,149,687.

(51) Int. Cl.
| | |
|---|---|
| *F02K 1/72* | (2006.01) |
| *B29C 33/48* | (2006.01) |
| *B29D 99/00* | (2010.01) |

(52) U.S. Cl.
CPC ............. *F02K 1/72* (2013.01); *B29C 33/485* (2013.01); *B29D 99/0089* (2013.01)

(58) Field of Classification Search
CPC ... F02K 1/62; F02K 1/625; F02K 1/70; F02K 1/72; F02K 1/80; F02K 1/827; F05D 2230/30; F05D 2240/129; B64C 33/485
See application file for complete search history.

(56) References Cited

U.S. PATENT DOCUMENTS

| | | | | |
|---|---|---|---|---|
| 4,852,805 | A | * | 8/1989 | Vermilye .......... B29C 45/14631 264/46.7 |
| 9,895,840 | B2 | | 2/2018 | Bartel |
| 2014/0190925 | A1 | * | 7/2014 | Ropele .................. B65D 53/06 215/44 |
| 2016/0130958 | A1 | * | 5/2016 | Ganoe .................. F01D 25/005 415/200 |
| 2016/0186689 | A1 | * | 6/2016 | Bartel ....................... F02K 1/64 264/296 |
| 2016/0263820 | A1 | | 9/2016 | Kruckenberg |
| 2017/0057166 | A1 | | 3/2017 | Soria |
| 2018/0236720 | A1 | | 8/2018 | Bartel |
| 2018/0340492 | A1 | | 11/2018 | Harpal |
| 2019/0176382 | A1 | * | 6/2019 | Chuck ..................... B29C 45/44 |

FOREIGN PATENT DOCUMENTS

| EP | 3584434 A1 | 12/2019 |
|---|---|---|
| FR | 3048025 B1 | 5/2019 |

* cited by examiner

*Primary Examiner* — Andrew H Nguyen
(74) *Attorney, Agent, or Firm* — Getz Balich LLC

(57) ABSTRACT

A method of producing a cascade array and a cascade array is provided. The method includes: forming a plurality of strongbacks from a first thermoplastic material; forming a plurality of comb subassemblies, each said comb subassembly including one of the plurality of strongbacks and a plurality of vanes comprising a second thermoplastic material extending outwardly from the respective one of the plurality strongbacks; and attaching the plurality of comb subassemblies into a unitary structure to produce the cascade array.

18 Claims, 6 Drawing Sheets

THRUST REVERSER CASCADE ARRAY AND METHOD FOR PRODUCING THE SAME

This application is a divisional of U.S. patent application Ser. No. 16/131,902 filed Sep. 14, 2018, which is hereby incorporated herein by reference in its entirety.

BACKGROUND OF THE INVENTION

1. Technical Field

The present disclosure relates to thrust reversers for aircraft propulsion systems and, more particularly, to thrust reverser cascade arrays and methods for manufacturing the same.

2. Background Information

Modern aircraft often include a thrust reverser incorporated into a nacelle housing a gas turbine engine. The thrust reverser may redirect the flow of air through the nacelle in order to apply a reverse thrust to the aircraft. One style of thrust reverser includes a translating sleeve. The translating sleeve may translate aft to deploy blocker doors into the bypass air duct of a nacelle. The blocker doors may redirect air in the bypass air duct outward through a series of cascade arrays which then turn the air forward, producing reverse thrust. Each cascade array may include multiple strongbacks that extend in an axial direction and vanes coupled between the strongbacks. The vanes within the cascade array turn the air in the forward direction, thus providing the reverse thrust.

Cascade arrays typically possess a relatively complex three-dimensional configuration that make their manufacture time consuming, labor intensive, and therefore expensive. Current fabricating techniques often involve hand layup of the individual vanes between adjacent strongbacks, and a subsequent curing process. This is a time intensive manual process, and therefore an expensive process.

Accordingly, there is a need for a cascade for a jet engine thrust reverser that functions as required, but is configured to facilitate manufacture and is therefore less expensive to produce.

SUMMARY OF THE INVENTION

According to an aspect of the present disclosure, a method of producing a cascade array is provided. The method includes: forming a plurality of strongbacks from a first thermoplastic material; forming a plurality of comb subassemblies, each said comb subassembly including one of the plurality of strongbacks and a plurality of vanes comprising a second thermoplastic material extending outwardly from the respective one of the plurality strongbacks; and attaching the plurality of comb subassemblies into a unitary structure to produce the cascade array.

In any of the aspects or embodiments described above and herein, the first thermoplastic material may include a thermoplastic resin and reinforcing fibers.

In any of the aspects or embodiments described above and herein, the second thermoplastic material may include a thermoplastic resin and reinforcing fibers.

In any of the aspects or embodiments described above and herein, at least one of the plurality of strongbacks may include at least one end portion extending outwardly from a lengthwise end of the respective strongback.

In any of the aspects or embodiments described above and herein, each comb subassembly may be formed by overmolding the respective one of the plurality of strongbacks with the second thermoplastic material to form the plurality of vanes.

In any of the aspects or embodiments described above and herein, the overmolding process may be an injection molding process.

In any of the aspects or embodiments described above and herein, the overmolding may include forming at least one fillet extending between a respective vane and the respective one of the plurality of strongbacks with the second thermoplastic material.

In any of the aspects or embodiments described above and herein, the step of forming at least one fillet may include forming a first fillet extending between the respective vane and the respective one of the plurality of strongbacks on a first side of the respective vane, and forming a second fillet extending between the respective vane and the respective one of the plurality of strongbacks on a second side of the respective vane, which first side is opposite the second side.

In any of the aspects or embodiments described above and herein, each respective vane may have a first lateral end and an opposite second lateral end, and wherein the first lateral end is contiguous with the respective one of the plurality of strongbacks.

In any of the aspects or embodiments described above and herein, the overmolding may include forming at least one fillet extending disposed at the second lateral end of each respective vane with the second thermoplastic material.

In any of the aspects or embodiments described above and herein, the attaching the plurality of comb subassemblies into said unitary structure to produce the cascade array may include welding a first one of the plurality of comb subassemblies to a second one of the plurality of comb subassemblies.

In any of the aspects or embodiments described above and herein, the first one of the plurality of comb subassemblies may be welded to the second one of the plurality of comb subassemblies using a welding technique, an example of which may be but not limited to an ultrasonic welding technique.

In any of the aspects or embodiments described above and herein, the overmolding may include forming at least one fillet extending disposed at the second lateral end of each respective vane with the second thermoplastic material, and the attaching the plurality of comb subassemblies into said unitary structure to produce the cascade array may include welding a first one of the plurality of comb subassemblies to a second one of the plurality of comb subassemblies, including welding at least one fillet extending disposed at the second lateral end of each respective vane to the second one of the plurality of comb subassemblies.

In any of the aspects or embodiments described above and herein, the method may further include attaching one or more peripheral members to the plurality of comb subassemblies to at least partially enclose the plurality of comb subassemblies.

In any of the aspects or embodiments described above and herein, the one or more peripheral members may comprise the first thermoplastic material, and the first thermoplastic material includes a thermoplastic resin and reinforcing fibers.

In any of the aspects or embodiments described above and herein, the attaching one or more peripheral members to the plurality of comb subassemblies to at least partially enclose the plurality of comb subassemblies may include welding the one or more peripheral members to the plurality of comb subassemblies.

In any of the aspects or embodiments described above and herein, the method may further comprise attaching a frame to the plurality of comb subassemblies, the frame defining a periphery of the cascade array.

In any of the aspects or embodiments described above and herein, the frame may comprise the first thermoplastic material, and the first thermoplastic material includes a thermoplastic resin and reinforcing fibers.

According to another aspect of the present disclosure, a cascade array is provided. The cascade array may include a plurality of comb subassemblies, each said comb subassembly including a strongback comprising a first thermoplastic material, and a plurality of vanes comprising a second thermoplastic material extending outwardly from the respective one of the plurality strongbacks. Each comb subassembly is welded to at least one other of the plurality of comb subassemblies.

In any of the aspects or embodiments described above and herein, the plurality of vanes within each comb subassembly may be overmolded to the respective strongback within the respective comb subassembly.

In any of the aspects or embodiments described above and herein, the cascade array may further include a frame attached to the plurality of comb subassemblies, the frame defining a periphery of the cascade array.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Figure 1:
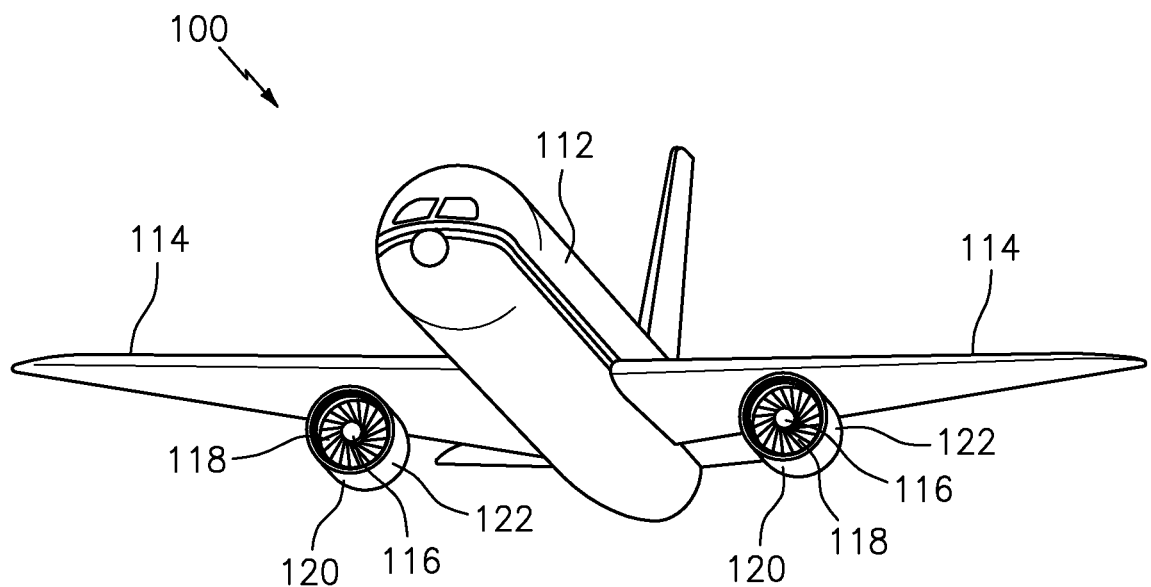
FIG. 1 illustrates a perspective view of an aircraft.
Figure 2:
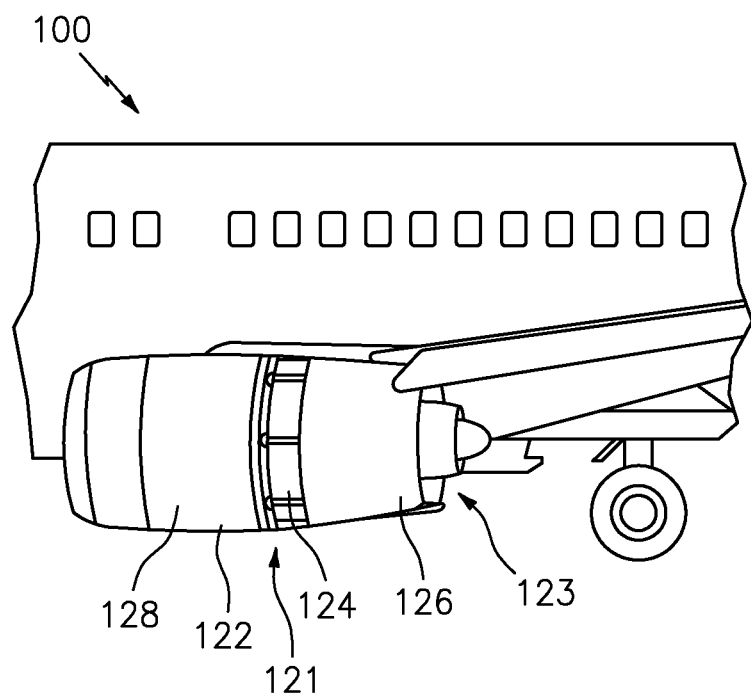
FIG. 2 illustrates a partial side view of the aircraft shown of FIG. 1 including a nacelle.
Figure 3:
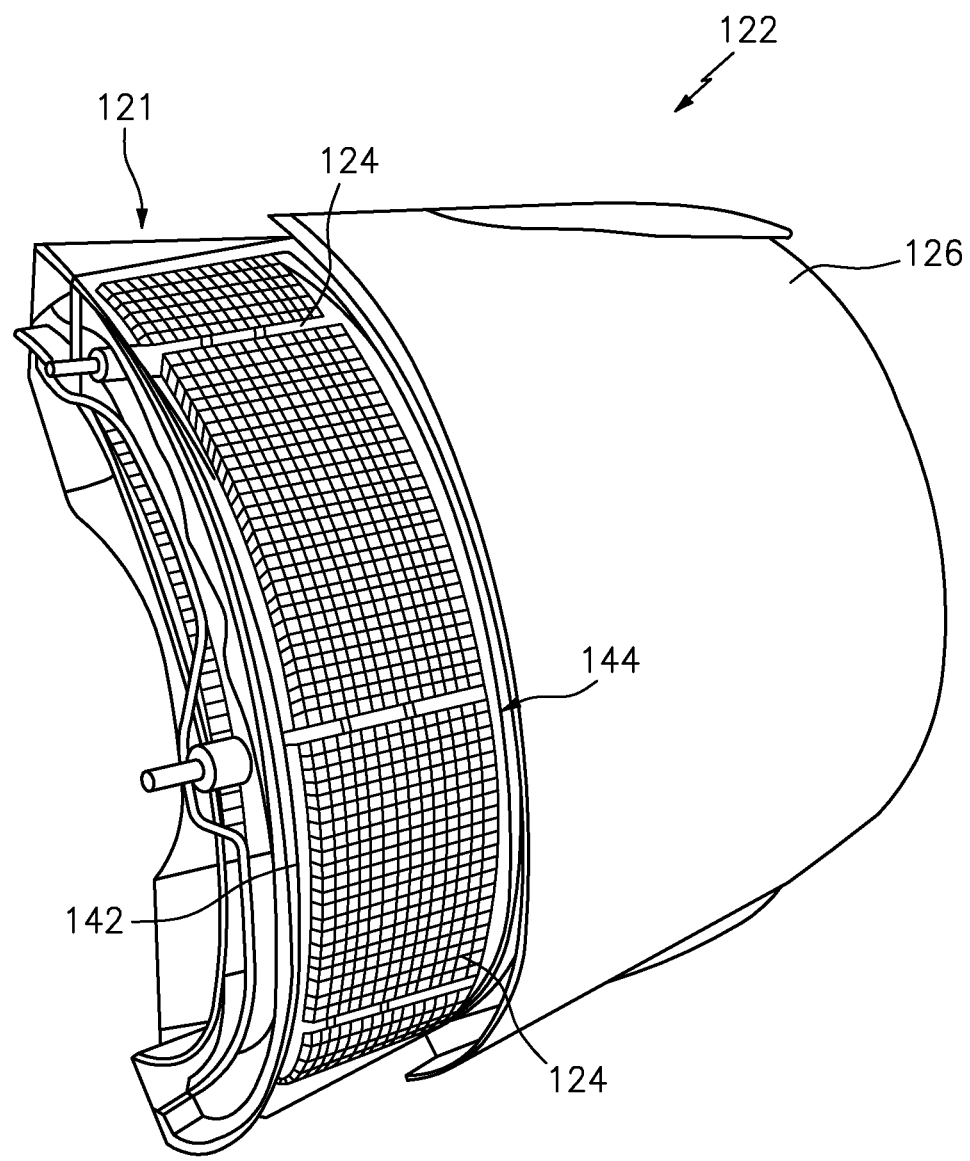
FIG. 3 illustrates a perspective view of a portion of the nacelle shown in FIG. 2 including a cascade array.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

In various embodiments and with reference to FIG. 1, an aircraft 100 may comprise a fuselage 112 and a pair of wings 114. A propulsion system 120 (e.g., a turbofan gas turbine engine with a nacelle assembly) may be coupled to the aircraft 100 (e.g., mounted on the underside of a wing 114). The propulsion system 120 may be configured to provide at least one of forward thrust or propulsion for aircraft 100.

In various embodiments, the propulsion system 120 may comprise an engine including a fan 118 and an engine core 116, housed within a nacelle assembly 122. The typical nacelle assembly, or more simply a nacelle 122, may comprise an inlet, a fan cowl, and a thrust reverser system 121, and an exhaust system 123. The nacelle surrounds the engine core 116 providing smooth aerodynamic surfaces for airflow around and into the engine. The nacelle also helps define a bypass air duct through the propulsion system 120.

In various embodiments, the fan 118 may draw and direct a flow of air into and through the propulsion system 120. After the fan 118, the air is divided into two principal flow paths, one flow path through engine core 116 (i.e., a "core airflow"), and another flow path through a bypass air duct (i.e., a "bypass airflow"). The engine core flow path is directed into the engine core 116 and initially passes through a compressor that increases the air flow pressure, and then through a combustor where the air is mixed with fuel and ignited. The combustion of the fuel and air mixture causes a series of turbine blades at the rear of the engine core 116 to rotate, and to drive the engine's compressor and fan 118. The high-pressure exhaust gases from the combustion of the fuel and air mixture are thereafter directed through an exhaust system 123 aft of the engine for thrust.

The thrust reverser system 121 includes one or more cascade arrays 124 (for ease of description, referred to hereinafter singularly as a cascade array 124). As a non-limiting example, a thrust reverser system 121 may include a translating sleeve 126 and an air diversion system (e.g., blocker doors, diversion doors, etc.—not shown) that is configured to direct airflow in the bypass duct through the cascade array to create reverse thrust. The translating sleeve 126 may translate and/or move aft, separating from a fan cowl 128. The aft movement of the translating sleeve 126 and the air diversion system cause air to be diverted through the cascade array 124 and directed forward to create reverse thrust.

Figure 4:
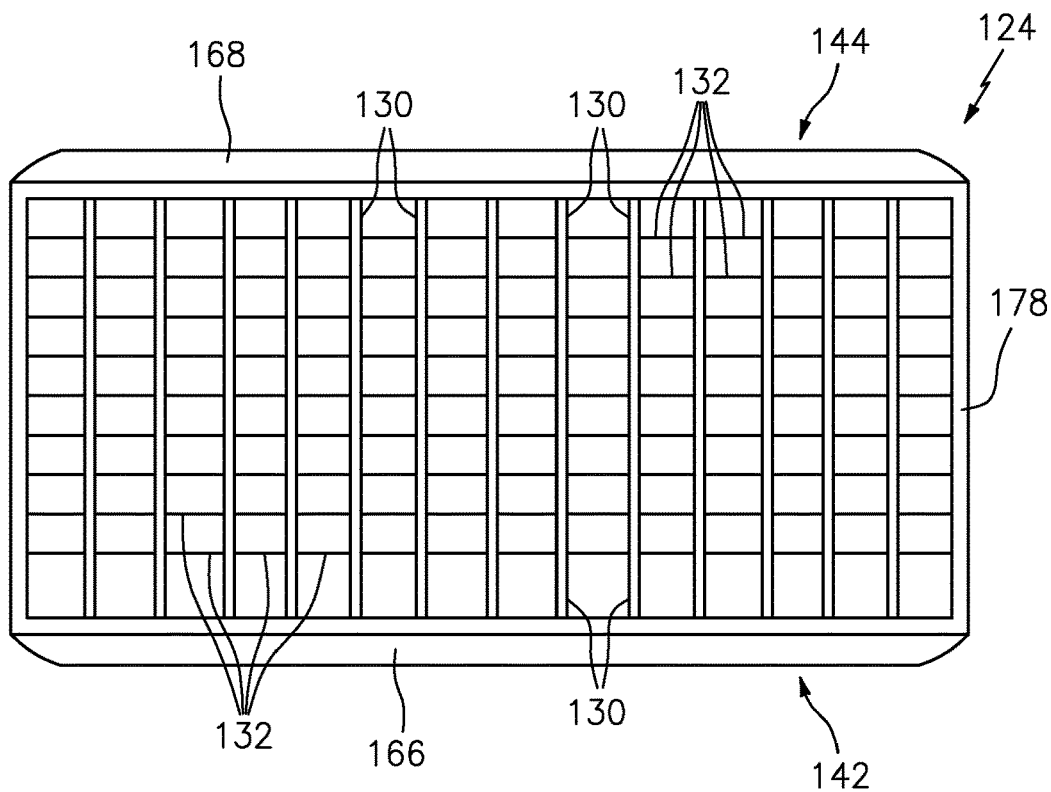
FIG. 4 is a diagrammatic view of a cascade array embodiment.
Figure 5:
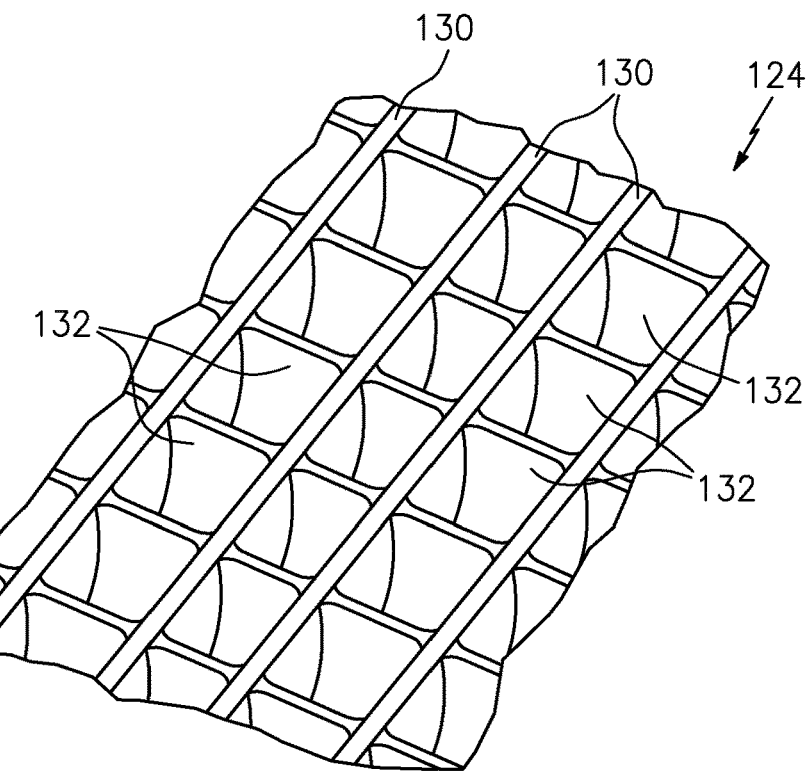
FIG. 5 is a diagrammatic partial view of a cascade array embodiment.

Referring to FIGS. 4 and 5, the cascade array 124 includes a plurality of strongbacks 130 and vanes 132 disposed between adjacent strongbacks 130. The strongbacks 130 extend lengthwise within the cascade array 124 and the vanes 132 are typically oriented orthogonal to the strongbacks 130. In some embodiments, some or all of the strongbacks 130 extend substantially the entire length of the cascade array 124, and in other embodiments some or all of the strongbacks 130 extend less than the entire length of the cascade array 124. In some embodiments, some of the strongbacks 130 may function as a frame for the cascade array 124; e.g., those strongbacks 130 disposed on the periphery of the cascade array 124. In some embodiments, the strongbacks 130 only extend lengthwise and do not form any part of a frame.

Figure 6:
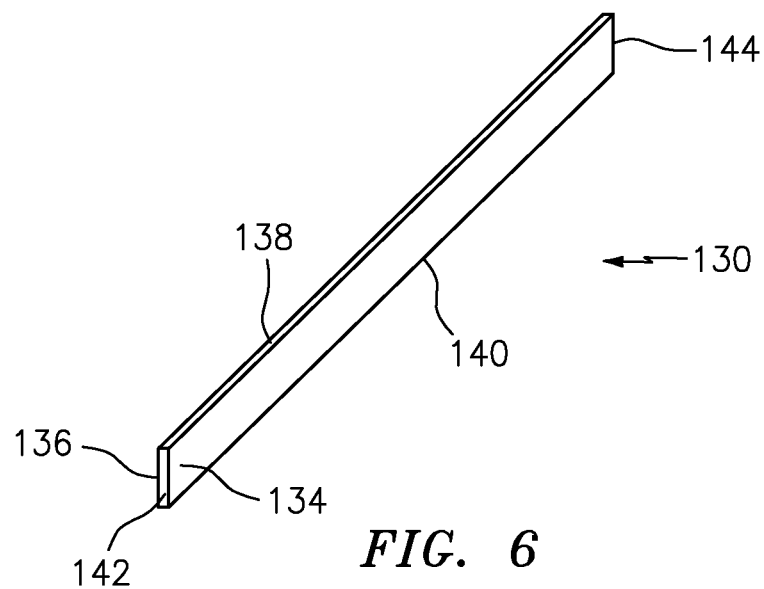
FIG. 6 is a diagrammatic perspective view of a strongback embodiment.
Figure 6A:
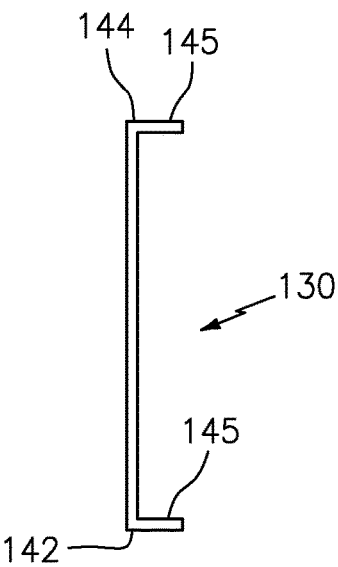
FIG. 6A is a diagrammatic perspective view of a strongback embodiment.

Referring to FIG. 6, each of the strongbacks 130 may have a body that includes a first side surface 134, a second side surface 136, a first end 138 (e.g., an outer end), a second end 140 (e.g., an inner end), a forward end 142, and an aft end 144. The first and second side surfaces 134, 136 are disposed on opposite sides of the body and typically parallel one another. The first and second ends 138, 140 are disposed on opposite sides of the body; e.g. outer and inner. The forward end 142 and the aft end 144 are disposed at opposite lengthwise ends of the respective strongback 130. The first and second side 134, 136 surfaces extend in a first direction between the first end 138 and the second end 140, and in a second direction (e.g., lengthwise, orthogonal to the first direction) between the forward end 142 and the aft end 144. In some embodiments, a strongback 130 may include an end portion 145 extending outwardly (e.g., orthogonally) at the forward end 142 or the aft end 144, or both (e.g., see FIG. 6A). The end portion(s) of the strongback may be configured to mate with a frame portion as will be described below. Each of the strongbacks 130 may be formed of a fiber reinforced thermoplastic material. The thermoplastic material may include a thermoplastic resin; e.g., a polyetheretherketone (PEEK) resin, or a Polyetherketoneketone (PEKK), Polyaryletherketone (PAEK), or the like, or any combination thereof. The fiber reinforcement within each strongback 130 may include unidirectional continuous fibers; e.g., carbon fibers, glass fibers, ceramic fibers, metal fibers, aramid fibers, etc. In some embodiments, the strongbacks 130 may be formed from layers of unidirectional thermoplastic tape combined to form a single body. In some embodiments, a stamping process may be used to form a strongback. For example in a stamping process, a layup of a plurality of tape layers may be created and the layup of tape is inserted into a stamping mold (e.g., at elevated temperature and pressure) to form a strongback with a desired geometry. The present disclosure is not limited to any methodology for forming the strongbacks 130; e.g., the strongbacks 130 may be formed by a stamping process, compression molding, an automated fiber placement (AFP) process that uses robotics to produce a substrate, etc.

Figure 7:
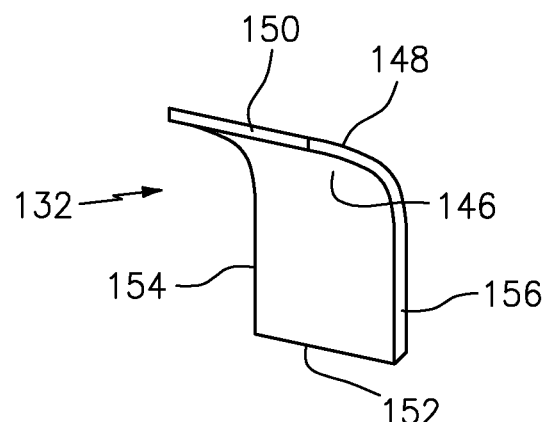
FIG. 7 is a diagrammatic perspective view of a vane embodiment.
Figure 8:
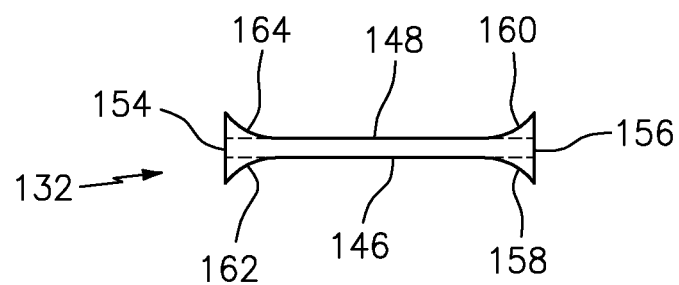
FIG. 8 is a diagrammatic view of a vane embodiment.
Figure 9:
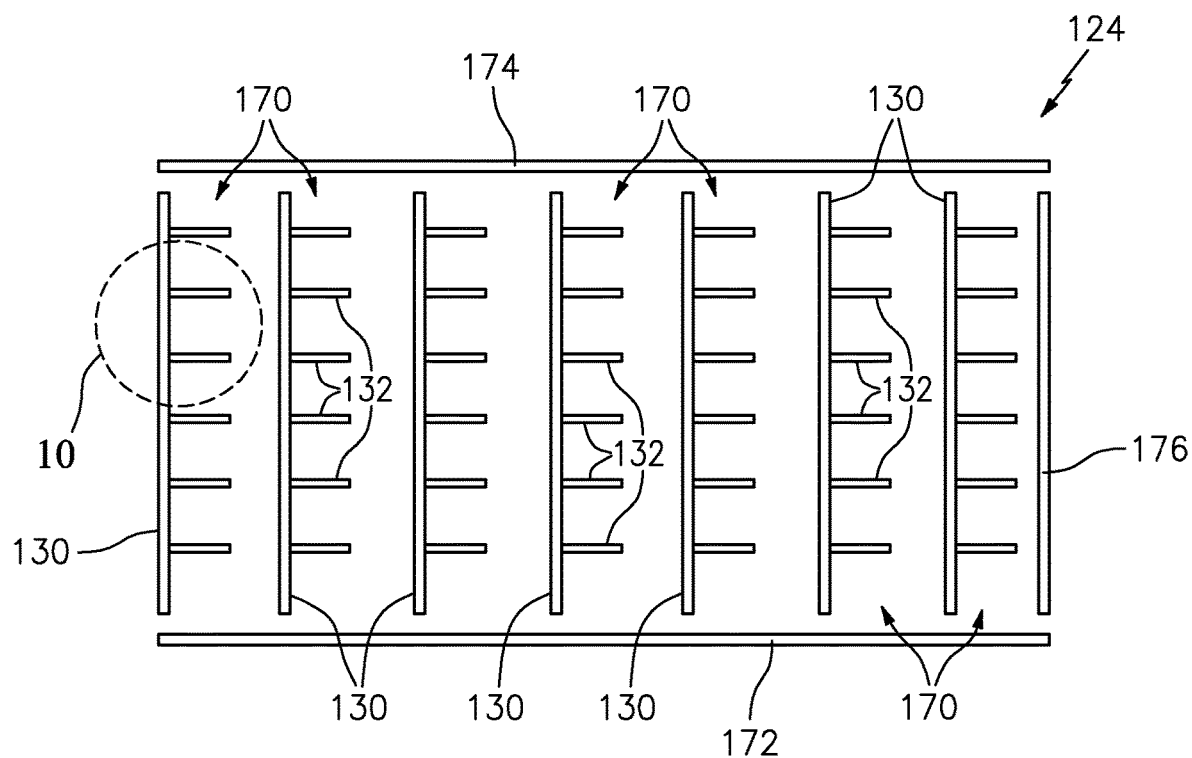
FIG. 9 is a diagrammatic exploded view of a cascade array embodiment, including comb subassemblies.
Figure 10:
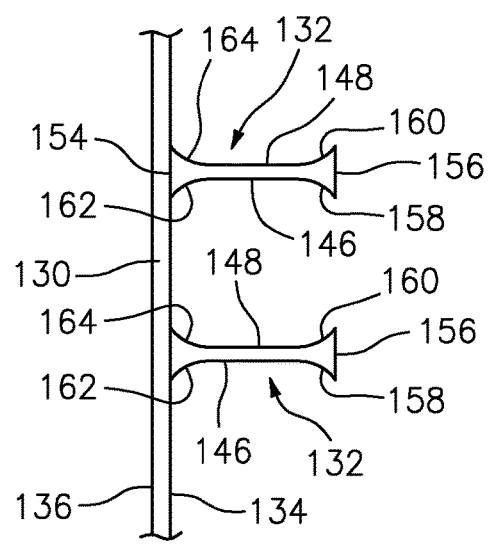
FIG. 10 is an enlarged view of a comb subassembly shown in FIG. 9.

Referring to FIGS. 7 and 8, each of the vanes 132 has a body that includes a first face surface 146, a second face surface 148, a first end 150 (e.g., an outer end), a second end 152 (e.g., an inner end), a first lateral end 154, and a second lateral end 156. The first face surface 146 may have a concave contour and the second face surface 148 may have a convex contour. The present disclosure is not, however, limited to any particular vane 132 configuration. The first and second face surfaces 146, 148 extend in a first direction between the first end 150 and the second end 152, and in a second direction (orthogonal to the first direction) between the first lateral end 154 and the second lateral end 156. Each vane 132 may be formed of a polymer resin. The polymer resin may be a thermoplastic polymer resin. Non-limiting examples of acceptable thermoplastic polymers include polyetherimide (PEI), polyphenylene sulphide (PPS), polyethersulfone (PES), polyetheretherketone (PEEK), polyetherketoneketone (PEKK), or polyetherketoneketone-fc grade (PEKK-FC). In some embodiments, the vanes 132 may be reinforced with fibers; e.g., glass fibers, carbon fibers, metal fibers, aramid fibers, or the like. The thermoplastic material that comprises the strongbacks 130 may be the same as, or different from the thermoplastic material that comprises the vanes 132. In some embodiments, an overmolded vane 132 may include a first fillet 158 extending along and outwardly from the first face surface 146, adjacent the second lateral end 156, and a second fillet 160 extending along and outwardly from the second face surface 148 adjacent the second lateral end 156. In some embodiments, an overmolded vane 132 may include a third fillet 162 extending along and outwardly from the first face surface 146, adjacent the first lateral end 154, and a fourth fillet 164 extending along and outwardly from the second face surface 148 adjacent the first lateral end 154.

In some embodiments, the cascade array 124 may include at least one forward attachment member 166 and/or at least one aft attachment member 168 (e.g., see FIG. 4). When a cascade array 124 is disposed as part of a thrust reverser system 121, the strongbacks 130 typically extend axially (e.g., generally aligned with the axially extending centerline of the engine), the vanes 132 are oriented orthogonally to the strongbacks 130, the forward attachment member 166 is disposed on a forward end of the cascade array 124 and the aft attachment member 168 is disposed on an aft end of the cascade array 124.

Figure 11:
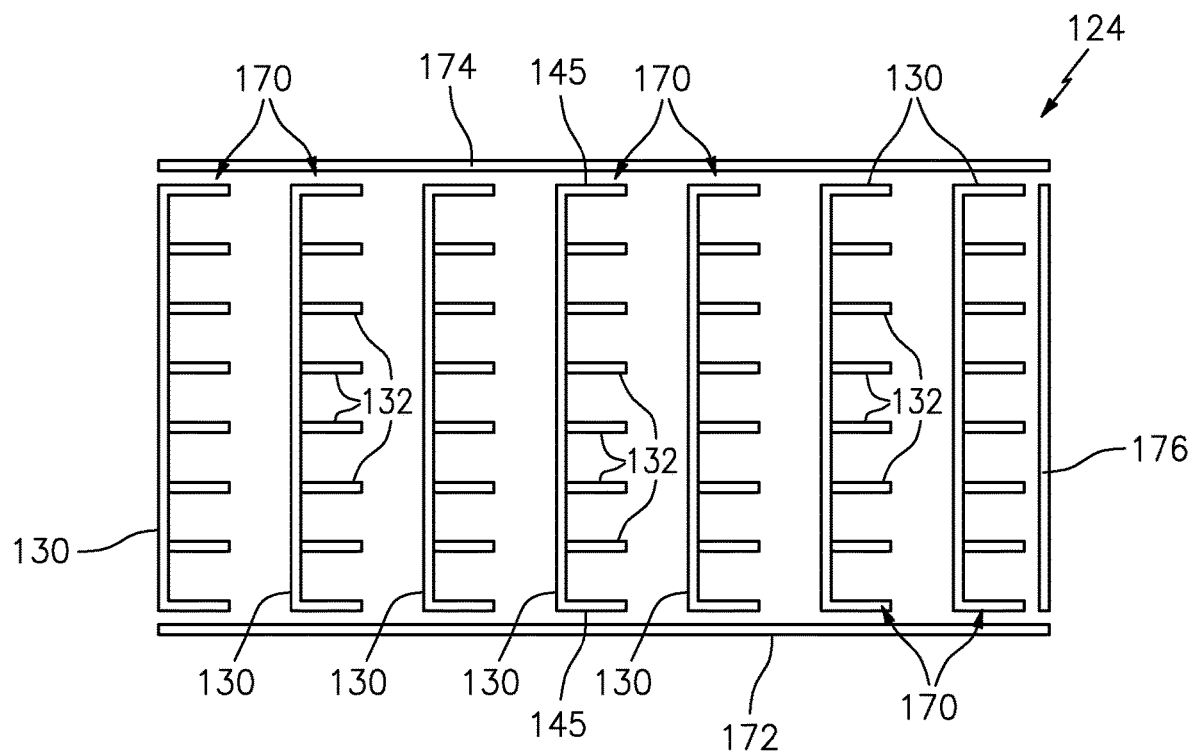
FIG. 11 is a diagrammatic exploded view of a cascade array embodiment, including comb subassemblies.

Referring to FIGS. 6-9, according to an aspect of the present disclosure, an improved method of manufacturing a cascade array 124 may be followed. For example, a cascade array 124 may be formed from a plurality of comb subassemblies 170. The term "comb subassembly" as used herein refers to a strongback 130 coupled with a plurality of vanes attached thereto. Each of the vanes 132 extends out from a side surface of a strongback 130, spaced apart from one another along the length of the strongback 130. Specifically, a lateral end (e.g., the first lateral end 154) of each vane 132 is contiguous with and joined to a side surface (e.g., the first side surface 134) of a strongback 130. As stated above, in some embodiments a strongback 130 may also include an end portion 145 extending outwardly (e.g., orthogonally) at the forward end 142 or the aft end 144, or both (e.g., see FIG. 6A). Collectively, the strongback 130 and the vanes 132 (and in some embodiments the end portions 145—see FIG. 11) form the comb subassembly 170. In some embodiments, a comb subassembly may include a fillets (e.g., first fillet 158, second fillet 160, third fillet 162, fourth fillet 164, etc., see FIG. 8) disposed at the lateral ends 154, 156 of a vane to increase the mechanical strength of the intersection of a strongback 130 and a vane 132, and to facilitate joining comb subassemblies 170 as will be discussed below. The present disclosure is not limited to the comb subassembly 170 embodiment described above; e.g., the present disclosure contemplates comb subassemblies 170 other than the described geometry wherein vanes 132 are formed to extend outwardly from a single side surface of the strongback 130.

In some embodiments, a comb subassembly 170 may be formed by an "overmolding" process. For example, a formed strongback may be inserted into a mold configured to receive the strongback 130, and which mold has a plurality of voids shaped to form the respective vanes 132. In those embodiments that include fillets 158, 160, 162, the mold may be configured to include voids that will form the fillets at the same time as the vanes 132. Once the formed strongback is disposed within the injection molding mold, the thermoplastic material of the vanes 132 (e.g., thermoplastic resin, and in some instances reinforcing fibers) is injected into the mold. The injected thermoplastic material bonds with the thermoplastic strongback 130 and once cooled, the comb subassembly having the strongback 130 and vanes 132 (and fillets 158, 160, 162, 164 in some instances) that be formed as a unitary structure. The unitary structure comb subassembly 170 can be readily formed in this manner, including removal from the injection molding mold once sufficiently cooled. Forming the comb subassemblies 170 in this manner permits complex cascade geometries to be formed; e.g., geometries either not possible using prior art cascade array 124 manufacturing techniques, or geometries that are quite difficult and therefore expensive to manufacture using prior art manufacturing techniques.

A plurality of comb subassemblies 170 (e.g., see FIG. 9) can subsequently be attached to one another to form the cascade array 124. For example, a plurality of comb assemblies 170 can be positioned relative to one another so the vanes 132 of a first comb subassembly 170 are placed in contact with the strongback 130 of a second comb subassembly 170, and so forth adding as many comb subassemblies 170 as necessary to form the desired cascade array 124. The present disclosure is not limited to any particular technique for joining the comb subassemblies 170 to one another. An example of an acceptable joining technique is an ultrasonic welding technique wherein an exposed lateral end of each vane (e.g., second lateral end 156) is joined to a side surface (e.g., second side surface 136) of a strongback 130.

In some embodiments a forward peripheral member 172, an aft peripheral member 174, and a side peripheral member 176 (e.g., all formed of strongback 130 type material) may be assembled with a plurality of comb subassemblies 170 to enclose the assembled comb subassemblies 170 and to provide structural support; e.g., the forward peripheral member 172 disposed at a forward end of the assembly, the aft peripheral member 174 disposed at an aft end of the assembly, and the side peripheral member 176 disposed at the open side of the assembly. The assembly may then be processed so that the comb subassemblies 170, the forward peripheral member 172, the aft peripheral member 174, and the side peripheral member 176 are all attached (e.g., consolidated) into a unitary structure that is the cascade array 124. In some embodiments, one or all of the peripheral members 172, 174, 176 may be consolidated with the comb subassemblies 170 using a welding process; e.g., an ultrasonic welding process. In other embodiments, a frame 178 (e.g., formed of strongback 130 type material—see FIG. 4) that defines the periphery of the cascade array 124 may be assembled, and an appropriate number of comb subassemblies 170 may then be inserted into the frame. The frame 178 and inserted comb subassemblies 170 may then be processed so that the comb subassemblies 170 and the frame 178 are all joined (e.g., consolidated) into a unitary structure that is the cascade array 124. In those embodiments wherein a strongback 130 includes an end portion 145 extending outwardly (e.g., orthogonally) at the forward end 142 or the aft end 144, or both (e.g., see FIGS. 6A and 11), the end portion 145 may be configured to mate with the respective peripheral member 172, 174, 176 or frame 178. In some embodiments, the frame 178 may be consolidated with the comb subassemblies using a welding process; e.g., an ultrasonic welding process.

In those embodiments that include fillets (e.g., first and second fillets 158, 160) disposed at a lateral end (e.g., a second lateral end) of each vane 132, the fillets provide additional bonding surface area and thereby improve the strength of bonding between respective comb subassemblies into a unitary structure that is the cascade array 124.

In some embodiments of the present disclosure, a method of producing a cascade array, comprising the steps described hereinafter. As stated above, the following steps may be executed in any order and are not necessarily limited to the order presented. A plurality of strongbacks may be formed from a first thermoplastic material. At least one of the strongbacks may be overmolded (e.g., by an injection molding process) to form a comb subassembly. The comb subassembly includes the at least one strongback and a plurality of vanes extending outwardly from at least one strongback. The plurality of vanes may comprise a second thermoplastic material. A plurality of formed comb subassemblies may be attached to each other and into a unitary structure as at least a part of the cascade array. In some embodiments, the overmolding process may include forming at least one fillet that extends between a respective vane and a strongback. In some embodiments, the overmolding process may include forming at least one fillet at each lateral end of a respective vane. In some embodiments, the method includes attaching one or more peripheral members to the plurality of comb subassemblies to at least partially enclose the plurality of comb subassemblies. In some embodiments, the method includes attaching a frame to the plurality of comb subassemblies, the frame defining a periphery of the cascade array.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cascade array, comprising:
 a plurality of comb subassemblies, each said comb subassembly comprising:
 a strongback comprising a first thermoplastic material forming a first side surface of the strongback; and
 a plurality of vanes formed by a second thermoplastic material overmolding the first thermoplastic material of the strongback, the plurality of vanes extending outwardly from the first side surface of the strongback, each vane of the plurality of vanes comprising a first lateral end and an opposite second lateral end, the first lateral end contiguous with the strongback, the second thermoplastic material overmolding the first thermoplastic material forming at least one fillet of each vane of the plurality of vanes, the at least one fillet including a first fillet disposed at the first lateral end of each vane of the plurality of vanes and a second fillet disposed at the second lateral end of each vane of the plurality of vanes, the first fillet extending between each vane of the plurality of vanes and the strongback, the second thermoplastic material forming each vane of the plurality of vanes spaced from adjacent portions of the second thermoplastic material along a length of the first side surface; wherein each second fillet of a first comb subassembly of the plurality of comb subassemblies is welded to a second comb subassembly of the plurality of comb subassemblies;
 wherein the first thermoplastic material is different than the second thermoplastic material.

2. The cascade array of claim 1, further comprising a frame attached to the plurality of comb subassemblies, the frame defining a periphery of the cascade array.

3. The cascade array of claim 1, wherein the first thermoplastic material includes a thermoplastic resin and reinforcing fibers.

4. The cascade array of claim 1, wherein the second thermoplastic material includes a thermoplastic resin and reinforcing fibers.

5. The cascade array of claim 1, further comprising one or more peripheral members at least partially enclosing the plurality of comb subassemblies.

6. The cascade array of claim 5, wherein the one or more peripheral members comprise the first thermoplastic material and the first thermoplastic material includes a thermoplastic resin and reinforcing fibers.

7. The cascade array of claim 1, further comprising a frame defining a periphery of the cascade array.

8. The cascade array of claim 7, wherein the frame comprises the first thermoplastic material and the first thermoplastic material includes a thermoplastic resin and reinforcing fibers.

9. The cascade array of claim 1, wherein the strongback of at least one comb subassembly of the plurality of comb subassemblies includes at least one end portion extending outwardly from a lengthwise end of the strongback.

10. The cascade array of claim 9, wherein the at least one end portion extends orthogonally from the strongback.

11. The cascade array of claim 9, further comprising one or more peripheral members at least partially enclosing the plurality of comb subassemblies.

12. The cascade array of claim 11, wherein the one or more peripheral members comprise the first thermoplastic material.

13. The cascade array of claim 12, wherein the at least one end portion mates with the one or more peripheral members.

14. The cascade array of claim 9, further comprising a frame defining a periphery of the cascade array.

15. The cascade array of claim 14, wherein the frame comprises the first thermoplastic material.

16. The cascade array of claim 15, wherein the at least one end portion mates with the one or more peripheral members.

17. The cascade array of claim 9, wherein the at least one end portion extends in a same direction as the plurality of vanes extending outwardly from the strongback of the at least one comb subassembly.

18. The cascade array of claim 1, wherein each vane of the plurality of vanes comprises a first face surface and a second face surface and wherein the first face surface has a concave contour and the second face surface has a convex contour.

* * * * *